Jan. 12, 1954     T. A. RIBICH     2,665,787
CLUTCH AND BRAKE FOR PAPER SEPARATOR DRIVE MECHANISMS
Filed Dec. 9, 1950     4 Sheets-Sheet 1

INVENTOR.
THOMAS A. RIBICH
BY

Jan. 12, 1954 T. A. RIBICH 2,665,787
CLUTCH AND BRAKE FOR PAPER SEPARATOR DRIVE MECHANISMS
Filed Dec. 9, 1950 4 Sheets-Sheet 2

INVENTOR.
THOMAS A. RIBICH
BY

Jan. 12, 1954 T. A. RIBICH 2,665,787
CLUTCH AND BRAKE FOR PAPER SEPARATOR DRIVE MECHANISMS
Filed Dec. 9, 1950 4 Sheets-Sheet 3

INVENTOR.
THOMAS A. RIBICH

Jan. 12, 1954 T. A. RIBICH 2,665,787
CLUTCH AND BRAKE FOR PAPER SEPARATOR DRIVE MECHANISMS
Filed Dec. 9, 1950 4 Sheets-Sheet 4

INVENTOR.
THOMAS A. RIBICH
BY

Patented Jan. 12, 1954

2,665,787

UNITED STATES PATENT OFFICE 2,665,787

CLUTCH AND BRAKE FOR PAPER SEPARATOR DRIVE MECHANISMS

Thomas A. Ribich, Cleveland, Ohio, assignor, by mesne assignments, to Weldon Tool Company Application December 9, 1950, Serial No. 199,982

2 Claims. (Cl. 192—12)

The invention relates to a paper separating machine and to a mechanism in that machine for controlling rotation of a friction roll which engages the sheets of paper.

In prior machines, wherein a friction roll engages the top sheet of a stack of papers to remove that top sheet from the stack, there has been no structure to cause the friction wheel to stop and start instantaneously. When a friction wheel coasts to a stop, several papers may be run through the machine after the machine has been shut down. Therefore, one of the objects of the present invention is to provide the friction feed wheel with a drive which will start and/or stop the wheel instantaneously.

Another object of the invention is to provide a drive for the friction wheel and a brake for the friction wheel wherein the drive includes a clutch synchronously connected for operation simultaneously with the brake.

Another object of the invention is to provide a clutch and pulley speed control unit which is simple in operation and economical to construct.

Another object of the invention is to provide a mechanism for adjusting the speed of rotation of the friction wheel.

Another object of the invention is to provide a gear and a pulley wheel mounted on the same shaft with engageable clutch faces and to provide means in the clutch shaft for engaging the clutch faces.

Other objects and a fuller understanding of this invention may be had by referring to the following description and claims, taken in conjunction with the accompanying drawings, in which:

Figure 1:
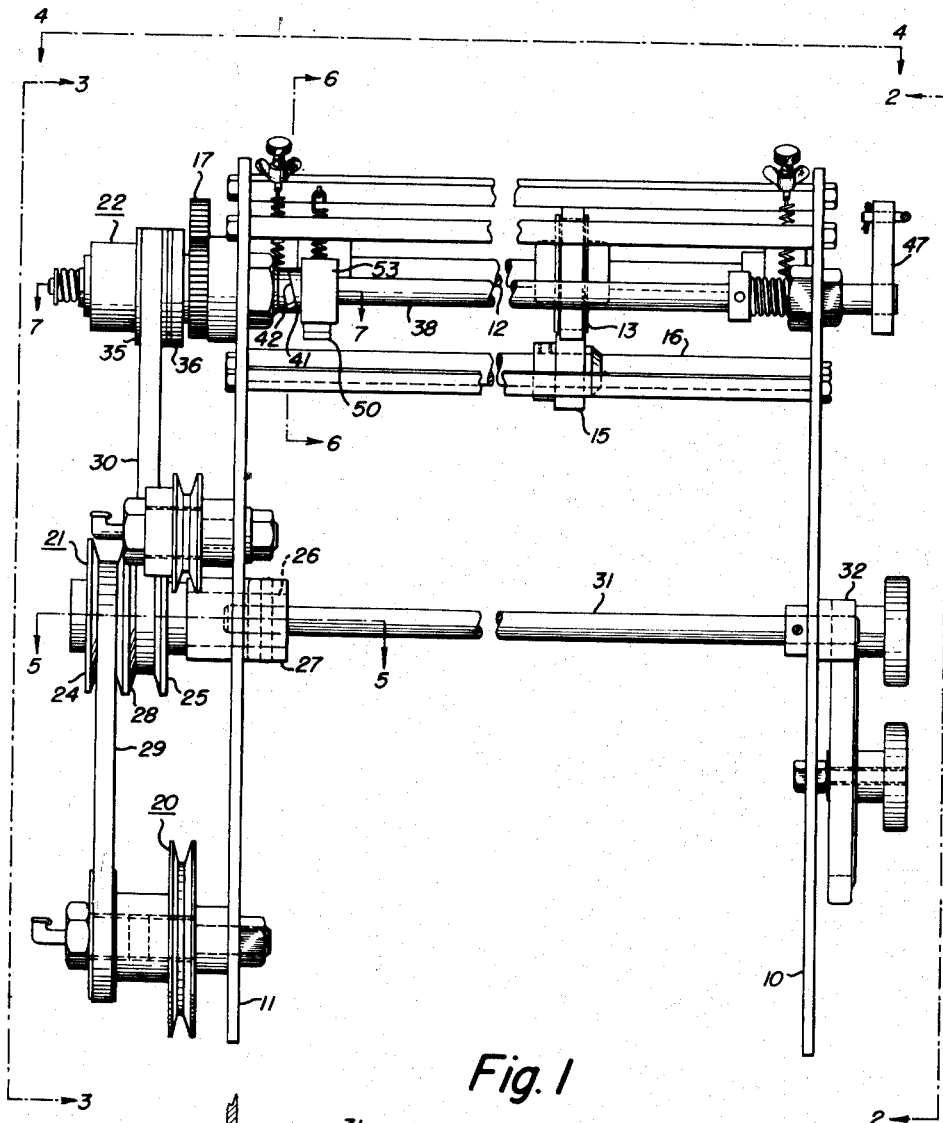
Figure 1 is an end view of the machine.

The paper separating machine illustrated in the drawings has the component parts thereof mounted on a pair of spaced side plates 10 and 11. These side plates 10 and 11 cooperatively support a friction wheel shaft 12 carrying a rotatable friction wheel 13 which engages the top sheet of a stack of papers P supported by a paper feed board 14 best illustrated in Figure 3. The paper feed board 14 is between the side plates 10 and 11 and the friction wheel shaft 12 is bearinged in pivotable bearings 112 which are anchored to the side plates 10 and 11. Directly adjacent the rotatable friction wheel 13 is a stationary wheel 15 carried by a shaft 16 with the stationary wheel positioned so that a single sheet of paper leaving the feed board 14 will pass between the rotatable friction wheel 13 and the stationary wheel 15.

Figure 3:
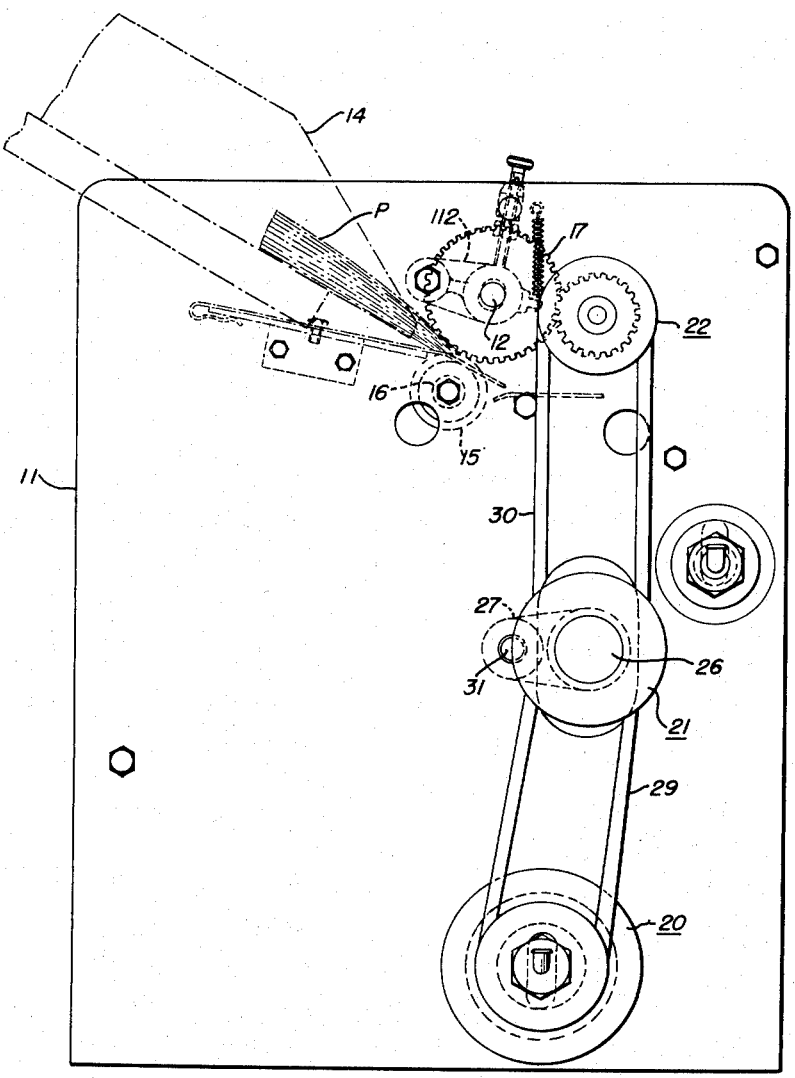
Figure 3 is a side view along the line 3—3 of Figure 1.

The friction wheel shaft 12 terminates on the outside of the side plate 11 in a gear 17 through which the friction wheel shaft 12 and thereby the friction wheel 13, is rotated. The gear 17 is driven by a main pulley 20 through a transmission pulley 21 and a clutch mechanism 22. The main pulley 20 may be a motor or any other drive means which will cause rotation. However, in the present instance, we have used a step-down pulley arrangement designated as the main pulley 20 which is rotatably mounted on the outside of the side plate 11. The pulley and the drive mechanism for the gear 17 and thus the friction wheel 13 are best illustrated in Figures 1 and 3 of the drawings.

Figure 5:
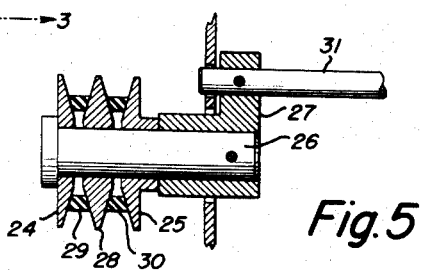
Figure 5 is a sectional view along the line 5—5 of Figure 1.
Figure 2:
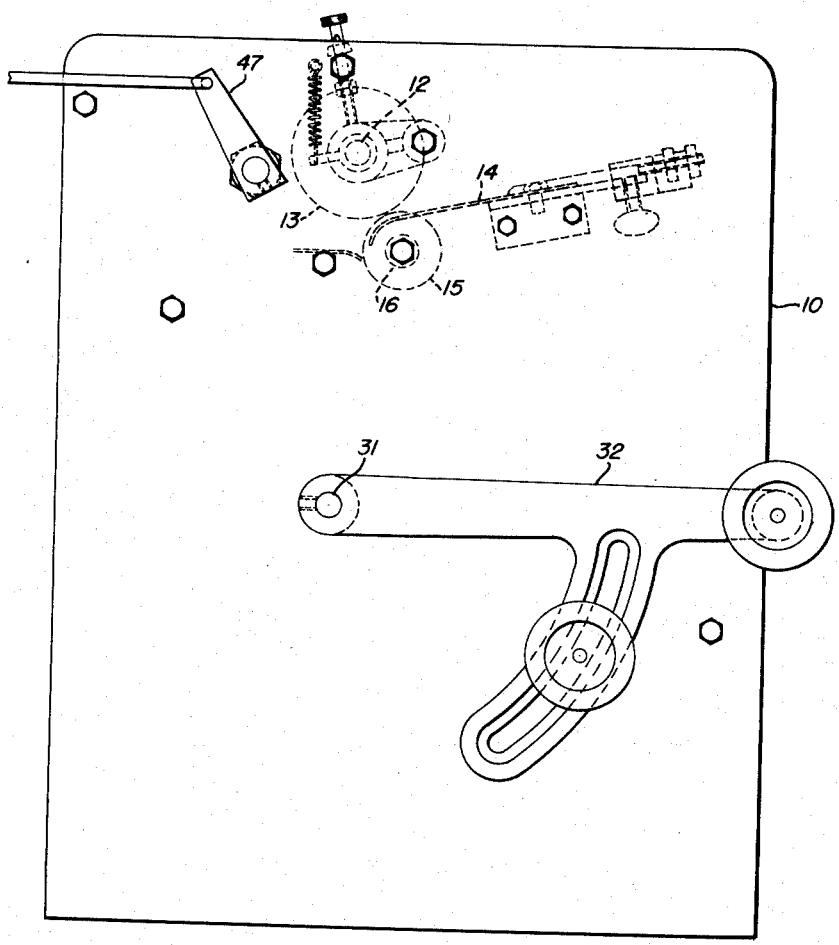
Figure 2 is a side view along the line 2—2 of Figure 1.

The transmission pulley 21 is illustrated in cross-section in Figure 5 as comprising pulley sections 24 and 25 spaced apart and commonly carried by a pin 26 on the end of a crank arm 27. Between the pulley sections 24 and 25 is a floating section 28 which spaces itself between the pulley sections 24 and 25 according to the tension of the pulley belts 29 and 30. The crank arm 27 is pivoted by means of an elongated rod 31 extending through both side plates and terminating in a hand set lever 32 illustrated in Figures 1 and 2 on the outside of the side plate 10. To adjust or change the speed of pulley belt 30 relative to speed of the pulley belt 29, the pin 26 is pivotally cranked in an upward or downward direction in Figure 3 allowing one belt to move toward the outside of one pulley section and causing the other belt to move to the inside of the other pulley section. With this arrangement any speed ratio may be obtained between the belts 29 and 30 or between the main pulley 20 and the clutch mechanism 22.

Figure 7:
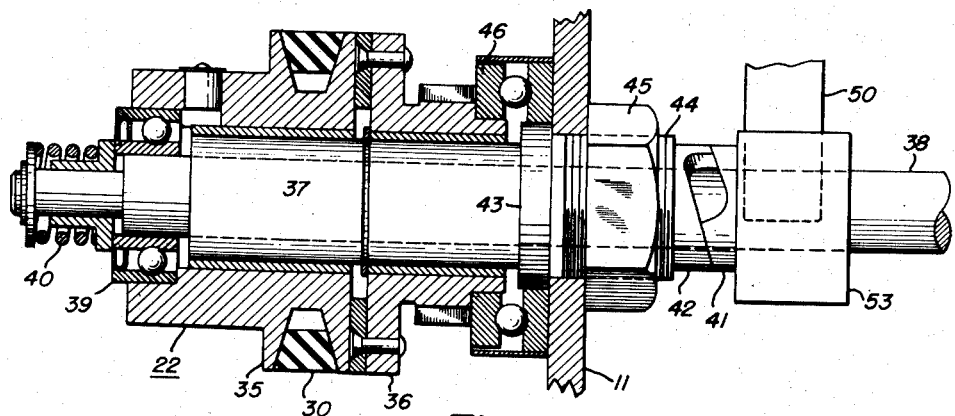
Figure 7 is an enlarged sectional view along the line 7—7 of Figure 1.

The clutch mechanism 22 is illustrated in fragmentary enlarged sectional view in Figure 7. The clutch mechanism 22 has a pulley clutch plate 35 and a gear clutch plate 36 bearinged on a hollow shaft 37 carried by the side plate 11 of the machine. The pulley belt 30 engages the pulley clutch plate 35 and the gear clutch plate 36 is geared to the gear 17 on the end of the friction wheel shaft 12. These clutch plates 35 and 36 have engageable clutch faces on the side surfaces thereof, which faces frictionally engage each other when the clutch plates 35 and 36 are axially forced together. Since both the pulley and the gear clutch plates are bearinged on the hollow shaft 37, I have provided a spring backed end thrust bearing mounted on a cam shaft 38 to urge the clutch plates 35 and 36 together. The cam shaft 38 extends through the hollow shaft 37 and is terminated on the end thereof in the thrust bearing 39 which engages the pulley clutch plate 35. The spring 40 operating between the cam shaft 38 and the thrust bearing 39 assures positive frictional engagement of the faces of the clutch plates 35 and 36. Endwise movement of the cam shaft 38 is obtained by providing the cam shaft 38 with a cam 41 and the hollow shaft 37 with a complementary cam 42. These cams 41 and 42 are arranged so that turning of the cam shaft 38 causes it to move endwise to either release or engage the clutch.

The hollow shaft 37 is supported on the side plate 11 by providing it with a shoulder 43 and threads 44. The threaded part extends through an opening in the plate and receives a nut 45 which tightens against the side plate 11. I have provided an end-thrust bearing 46 between the side plate 11 and the gear clutch plate 36 to carry thrust of axial movement when the clutch is engaged and to prevent wear of the gear clutch plate 36 as it rotates relative to the hollow shaft 37 and the side plate 11 of the machine. The cam shaft 38 may be extended through the side plate 10 and operated by a handle 47 so that the operation of the clutch, as well as the operation of the transmission pulley 21, are from the same side of the machine.

Figure 6:
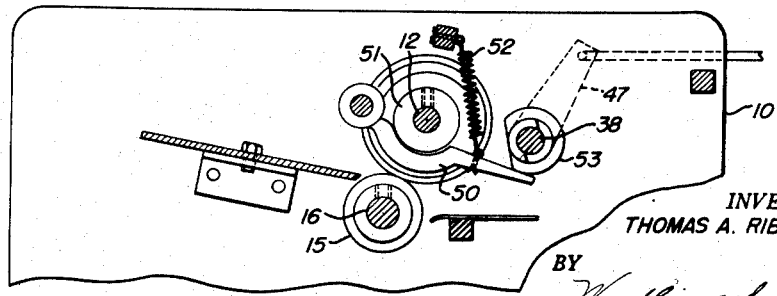
Figure 6 is a sectional view along the line 6—6 of Figure 1.
Figure 4:
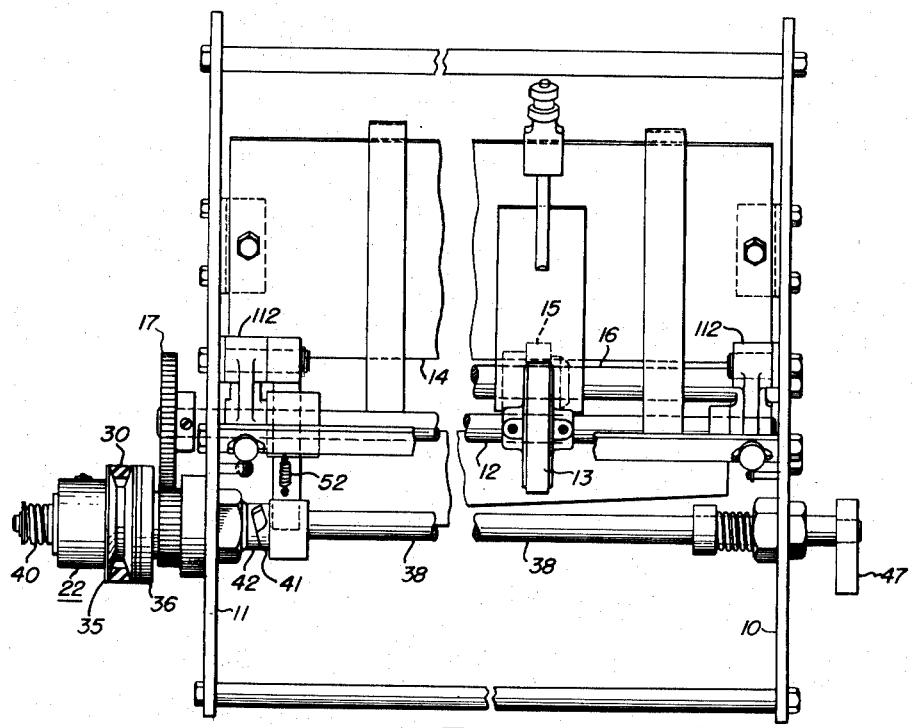
Figure 4 is a top view along the line 4—4 of Figure 1.

In this embodiment of the invention, instantaneous stopping of the friction wheel 13 to prevent coasting is obtained by using a brake arm. As is illustrated in Figure 6, the brake comprises a pivotally mounted brake arm 50 urges towards a brake shoe 51 mounted on the friction wheel shaft 12 by a spring 52. One end of the spring 52 is fastened to a cross arm stationarily mounted between the side plates 10 and 11 and the other end of the spring 52 is mounted to the brake arm 50. Movement of the brake arm against the brake shoe is controlled by a cam 53 on the cam shaft 38. Since the cam 53 controlling the brake is mounted on the cam shaft 38 which controls engagement and disengagement of the clutch mechanism 22, the operation of the clutch mechanism and the brake mechanism are synchronized so that the brake is engaged when the clutch is disengaged. By having the brake engaged to instantaneously stop the friction wheel 13 instantly upon disengagement of the driving clutch, coasting of the wheel is prevented, thereby preventing separation of papers from the stack P after the machine is shut down. Instantaneous driving and rotation is also produced since the clutch engages when the brake is disengaged. Thus, the friction wheel is either running at the desired speed or it is standing still. The synchronized control of the clutch and brake mechanism is obtained by synchronizing the high and low points of the respective cams for the mechanisms to synchronously release the brake and apply the clutch or to simultaneously release the clutch and apply the brake. A much closer control of the operation of the machine is thus available, through the combination of the synchronized clutch arrangement along with the use of the transmission pulley.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a paper separator device, the provision of an improved paper feed drive and start-stop mechanism therefore, comprising, a driven shaft, a separate control shaft mounted for longitudinal reciprocation and rotation about the longitudinal axis thereof between a brake producing position and a drive producing position, brake means operable upon said driven shaft, a radially extending cam carried by said control shaft, a cam follower contactable by said radially extending cam, actuation means interconnecting said cam follower and brake means, said cam and cam follower thereby applying said brake when the control shaft is moved to said brake producing position and releasing said shaft in said drive producing position, and clutch drive means for said driven shaft including a tubular sleeve bearing supporting said control shaft, a driven clutch member and a drive clutch member rotatably mounted on the outer surface of said sleeve bearing, drive transfer means interconnecting said driven clutch member and said driven shaft, prime mover drive means rotatably driving said drive clutch member, stationary cam means, cam follower means carried by said control shaft, said stationary cam means and cam follower means cooperating to produce an endwise shifting of said control shaft as the control shaft is rotated from said brake producing position to the drive producing position wherein the clutch members are engaged, spring cushioned thrust bearing means interconnecting said control shaft and said drive clutch member, said spring cushion being put under compression by said control shaft only when the control shaft is in the drive producing position, the angular position of the said radially extending cam with respect to the said stationary cam means being selectable to provide a selected change relationship between braking and drive conditions, including a time delay, overlap, or instantaneous shift.

2. In a paper separator device, the provision of an improved paper feed drive and start-stop mechanism therefore, comprising a driven shaft, a separate control shaft mounted for longitudinal reciprocation and rotation about the longitudinal axis thereof between a brake producing position and a drive producing position, brake means operable upon said driven shaft, a radially extending cam carried by said control shaft, a cam follower contactable by said radially extending cam, actuation means interconnecting said cam follower and brake means, said cam and cam follower thereby applying said brake when the control shaft is moved to said brake producing position and releasing said shaft in said drive producing position, and clutch drive means for said driven shaft including a driven clutch member and a drive clutch member, drive transfer means interconnecting said driven clutch member and said driven shaft prime mover drive means rotatably driving said drive clutch member, stationary cam means, cam follower means carried by said control shaft, said stationary cam means and cam follower means cooperating to produce an endwise shifting of said control shaft as the control shaft is rotated from said brake producing position to the drive producing position wherein the clutch members are engaged, spring cushioned thrust bearing means interconnecting said control shaft and said drive clutch member, said spring cushion being put under compression by said control shaft only when the control shaft is in the drive producing position, the angular position of the said radially extending cam with respect to the said stationary cam means being selectable to provide a selected change relationship between braking and drive conditions, including a time delay, overlap, or instantaneous shift.

THOMAS A. RIBICH.

References Cited in the file of this patent

UNITED STATES PATENTS

| Number | Name | Date |
|---|---|---|
| 715,424 | Sawyer | Dec. 9, 1902 |
| 1,031,302 | Tucker | July 2, 1912 |
| 1,184,453 | Hopkins | May 23, 1916 |
| 1,351,792 | Sawyer | Sept. 7, 1920 |
| 1,443,430 | Olgay | Jan. 30, 1923 |
| 1,475,470 | Ter Cock | Nov. 27, 1923 |
| 1,639,543 | Viall | Aug. 16, 1927 |
| 1,662,566 | Dohle | Mar. 13, 1928 |
| 1,956,632 | Snyder | May 1, 1934 |
| 1,962,715 | Heilman | June 12, 1934 |
| 1,991,989 | Trompier | Feb. 19, 1935 |
| 2,006,040 | Crane | June 25, 1935 |
| 2,191,531 | Judelshon | Feb. 27, 1940 |
| 2,204,715 | Wimmer | June 18, 1940 |

OTHER REFERENCES

Kent: Mechanical Engineers Handbook, Design and Shop Practice, 11th edition, published by John Wiley—1938.

Marks: Mechanical Engineers Handbook, 4th edition, published by McGraw-Hill—1941.